(No Model.)  3 Sheets—Sheet 1.
D. H. MERRITT.
FRICTION CLUTCH AND BRAKE FOR HOISTING, &c.
No. 253,083.  Patented Jan. 31, 1882.
Fig. 1,
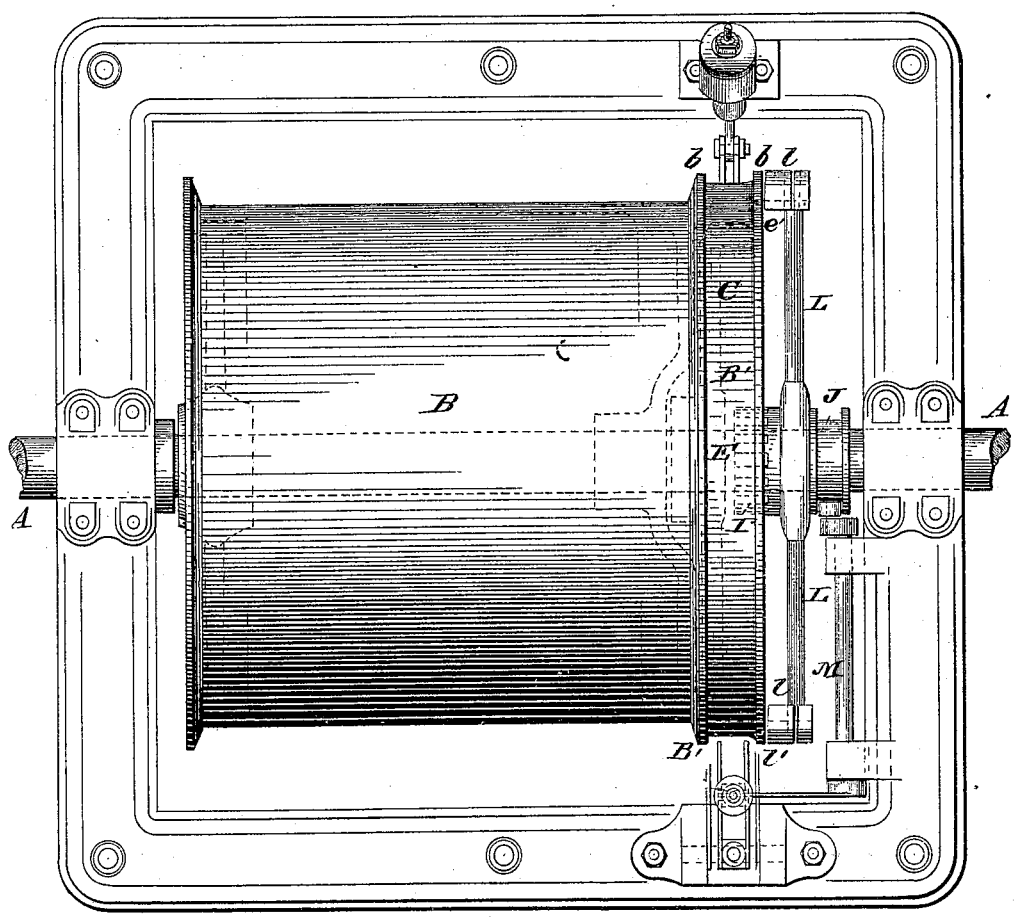
WITNESSES
Fred. G. Dieterich
Charles H. Bates
INVENTOR
Daniel H. Merritt
per DeWitt C. Allen, Attorney
N. PETERS. Photo-Lithographer, Washington, D. C.

(No Model.) 3 Sheets—Sheet 2.
D. H. MERRITT.
FRICTION CLUTCH AND BRAKE FOR HOISTING, &c.
No. 253,083. Patented Jan. 31, 1882.
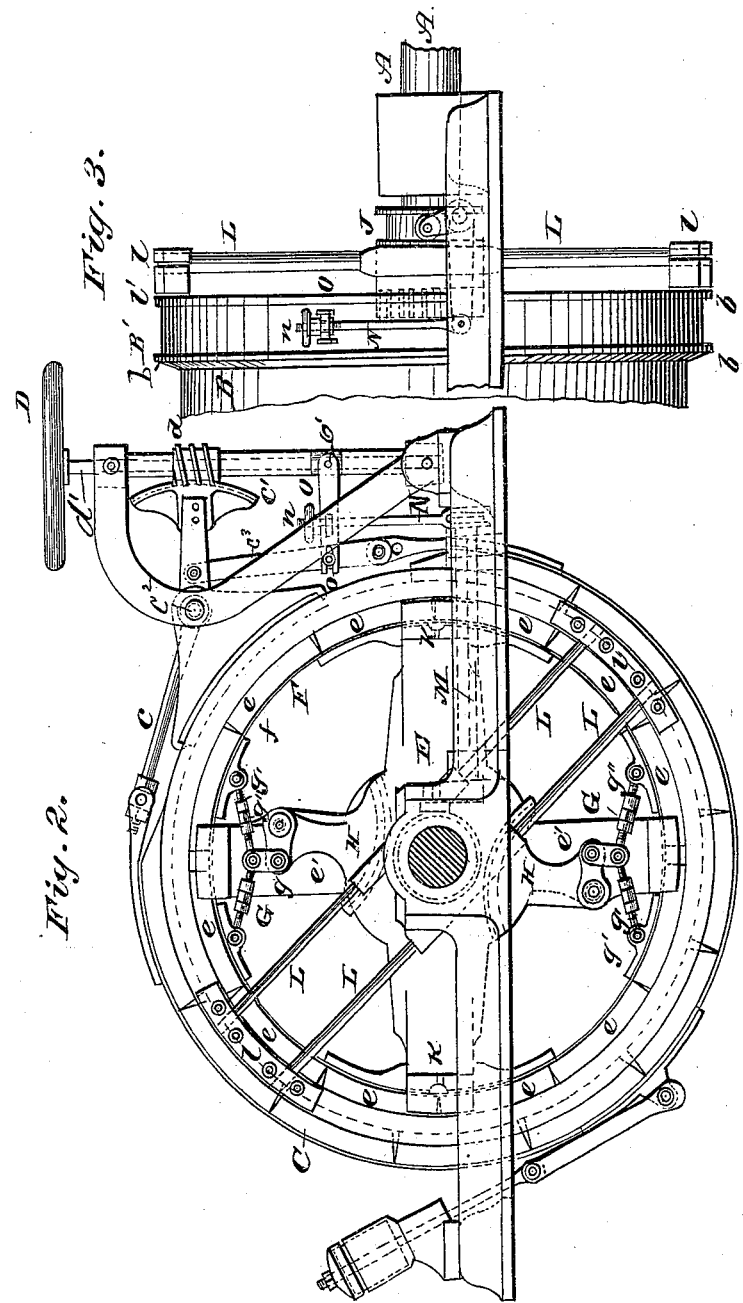
WITNESSES
Fred. G. Dieterich
Charles H. Baker
INVENTOR
Daniel H. Merritt
per.
DeWitt C. Allen, Attorney (No Model.) 3 Sheets—Sheet 3.

D. H. MERRITT.
FRICTION CLUTCH AND BRAKE FOR HOISTING, &c.

No. 253,083. Patented Jan. 31, 1882.

WITNESSES
Fred. G. Dieterich
C. H. Baker

INVENTOR
Daniel H. Merritt
per DeWitt C. Allen Attorney

N. PETERS. Photo-Lithographer, Washington, D. C.

UNITED STATES PATENT OFFICE.

DANIEL H. MERRITT, OF MARQUETTE, MICHIGAN.

FRICTION CLUTCH AND BRAKE FOR HOISTING, &c.

SPECIFICATION forming part of Letters Patent No. 253,083, dated January 31, 1882.

Application filed November 29, 1881. (No model.)

*To all whom it may concern:*

Be it known that I, DANIEL H. MERRITT, a citizen of the United States, residing at Marquette, in the county of Marquette and State of Michigan, have invented certain new and useful Improvements in Friction Clutches and Brakes for Hoisting and other Machinery; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to certain new and useful improvements in the class of friction-clutches employing a friction-band expanded by toggles against the interior surface of a friction-rim on the winding-drum or other part griped by the clutch, and more particularly to improvements upon my former patent dated February 8, 1881, and numbered 237,570.

The principal object of my present improvement is to reduce the labor for starting the drum as much as possible, and to do it promptly and yet easily and without jerking; and to this end the invention consists in novel features of construction and combination and arrangement of parts, all as will be hereinafter fully described, and specifically designated in the claims.

Figure 4:
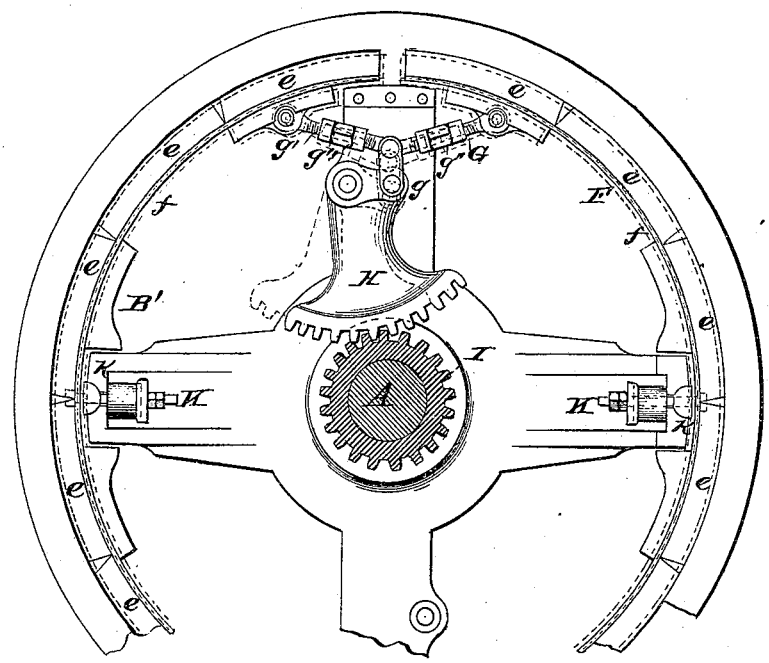
Figure 5:
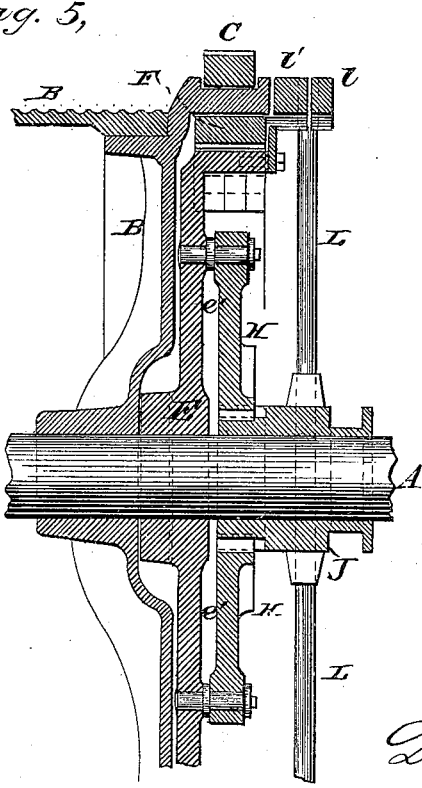

Referring to the accompanying drawings, Figure 1 represents a top view or plan of a hoisting-machine embodying my improvements; Fig. 2, an end elevation of the same; Fig. 3, detail view of mechanism for operating the sliding sleeve and starting-gear, and also the adjustable connecting mechanism between inner and outer clutch and brake bands; Fig. 4, detail view of starting-gear, toothed segments, toggles, and internal clutch-bands, with retracting-springs to keep the clutch-band clear from friction-rim, and showing respectively in plain and dotted lines the position of one of the toothed segments, toggle-bars, &c., with the internal clutch-band on and off the friction-rim; Fig. 5, sectional view of starting-gear, toothed segments, driver, friction-rim, and brake and clutch bands.

In the drawings, A represents the driving-shaft, to which power is applied, and B the winding-drum loosely mounted thereon. One end of the winding-drum is formed with a friction-rim, B', having a finished face on both its outer and its inner sides, with which the external and internal brake and clutch bands respectively engage. The outer face of said friction-rim has marginal flanges $b\ b$, and a brake-band, C, lies between said flanges and encircles the outer face of the rim, as clearly shown in Figs. 2 and 5. The opposite ends of the brake-band C are connected by adjustable rods $c\ c^3$ to opposite arms of a lever or toothed segment, $c'$, fulcrumed at the point $c^2$, Fig. 2, and which segment meshes with a worm, $d$, on a spindle, $d'$, which is operated by a hand-wheel, D. By turning to the right the band may be contracted to stop the motion of the drum through the medium of the rod $c^3$, connecting one end of the band with the segment $c'$, or in turning to the left the band loosened to permit the free rotation thereof. This brake-band, as will be readily understood, is used in unwinding to regulate the descent of the load or to stop the load or the unwinding motion at any point.

The end of the drum from which the friction-rim projects is recessed, and in the recess is arranged the driving-hub E, having driving-arms $e'$, which is keyed to and revolves with the driving-shaft A. This armed hub carries a friction-clutch band, F, which also lies in the recess of the drum, and when expanded engages the inner face of the friction-rim, and when relaxed revolves clear of the same in a noiseless manner. The friction-band is formed of a wrought-iron band, $f$, on the outside of which wooden segments or shoes $e$ are fixed, and this band is formed in semicircular sections, which are joined across the divisions by toggles G G, which are connected by pivoted link or links $g$ to toothed segments H H, fulcrumed on the opposite arms $e'\ e'$ of the driving-hub E, and which mesh with a starting-gear, I, which is cast integral with or otherwise connected to a sliding sleeve, J, capable of rotating and sliding longitudinally on the driving-shaft A.

The starting-gear and sleeve are provided with cross-bars or levers L L, having friction-blocks $l\ l$ attached to their outer ends at proper distances to be brought in contact with the side $l'$ of the friction-rim $B'$ of the hoisting-drum B. The toothed segments, being fulcrumed to the arms of the driver, rotate with the latter, carrying the starting-gear with cross-bars and friction-blocks around with it.

The friction-clutch band F is held back from the friction-rim $B'$ by strong retracting-springs K, centrally connected to the sections of the band and to the outer ends of the drive-arms by bolts having adjusting nuts for regulating the tension of the springs, and said drive-arms having recesses in the ends for the reception of a packing, $k$, to compensate for wear of the clutch-band F and keep it within a short distance from the rim $B'$ while it is held back by the springs K. In addition to these springs, the elasticity of the brake-band itself acts as a strong spring, pushing the toothed segments back sufficiently to overcome the resistance of the starting-gear with cross-bars and friction-blocks while carrying it around.

To start the drum the starting-gear is pushed toward it by means of a forked lever, M, engaging with the sliding sleeve. When the friction-blocks $l$ come in contact with the side $l'$ of the friction-rim $B'$, which is at rest, their rotation is stopped, holding the starting-gear back, while the toothed segments which mesh with said gear continue to rotate with the driver. The result is that the position of said segments will be changed, forcing the toggles G outward and pressing the internal clutch-band, F, firmly against the inside of the friction-rim $B'$. As soon as this pressure is sufficient (or the toothed segments and toggles have changed from the position shown in dotted lines to that shown in full lines, Fig. 4) to start the drum the whole system will rotate together simultaneously without creating more pressure on the teeth of segments and starting-gear than necessary to avoid slipping of the clutch-band F.

The principal object of the above-described improvements is to reduce the labor necessary for starting the drum as much as possible, and to do it promptly and yet easily without jerking.

To stop the drum the starting-gear is pushed back, the adhesion of the friction-blocks with the rim $B'$ thereby suspended, leaving the starting-gear free to rotate independently, while the toothed segments yield to the elasticity of the clutch-band F, carrying the starting-gear part of a turn forward, when the toothed segments and toggles will be in the position shown in dotted lines, Fig. 4, with the inside brake-band released from the friction-rim $B'$, allowing the drum B to run back, if not held by the outside brake-band C.

Another improvement relates to the means whereby both the internal and outside brake-bands are operated from one hand-wheel and the means for adjusting and regulating them nicely, so that the point of starting is very definite, with the allowable amount of brake clearance for any given load, which is composed of the following mechanism: The lever M, which engages the sliding sleeve J, (through the medium of which the internal clutch mechanism is operated,) is connected to a lever, O, by adjusting-rod N, provided with small adjusting-wheel $n$. The lever O is fulcrumed at its outer end, $o'$, and its other end slotted to engage a lug, $o$, on the arm $c^3$, which operates the outside brake through the medium of the toothed segment $c'$ and worm $d$ on spindle $d'$, operated by hand-wheel D.

The allowable amount of brake clearance for any given load can be regulated very nicely by turning the small adjusting-wheel $n$ forward or back, so as to effect contact of the brake-bands sooner or later, as may be found expedient.

It will thus be seen that the mechanism for operating both the outside and internal brake and clutch bands is operated from the same hand-wheel D, so that when one band is thrown into engagement with the friction-rim the other band is thrown out of engagement with said rim, and vice versa.

To adjust the internal clutch-band or the expanding mechanism thereof to make up for wear, I make the toggle-bars $g'$ $g'$ in sections, and connect them together by a screw-coupling, $g''$, or other equivalent coupling, whereby said bars $g'$ may be lengthened or shortened, as may be found expedient.

Having thus fully described my present invention, I do not wish to be understood as claiming broadly in this case anything shown, described, or claimed in my former patent before referred to; but

What I do claim as new, and desire to secure by Letters Patent, is—

1. The combination, with the friction-rim, of the movable or sliding starting-gear, having cross-bars provided with friction-blocks $l$, adapted to engage the side of said rim for the purpose of stopping said gear, substantially in the manner as and for the purpose herein shown and described.

2. The combination, with the friction-rim $B'$ and the internal clutch-band, F, of the movable or sliding starting-gear having cross-bars provided with friction-blocks $l$, adapted to engage the side of said rim, and intermediate mechanism for connecting said gear with the internal clutch-band, all substantially in the manner as and for the purpose herein shown and described.

3. The combination, with the friction-rim and clutch-band and a revolving starting-gear adapted to be stopped in its rotation, of mechanism connecting said band with the starting-gear, consisting of the toggle G and pivoted toothed segment, all substantially in the manner as and for the purpose herein shown and described.

4. The combination, with the friction-rim and clutch-band, of the pivoted toothed segments, mechanism, substantially as described, for connecting said segments with the clutch-band, movable or sliding and rotating starting-gear, and means for throwing it into mesh with said segments and stopping its rotation, all substantially in the manner as and for the purpose herein shown and described.

5. The combination, with the friction-rim on the drum and internal clutch-band, F, of the toggles G G, having adjustable sectional bars $g'\ g'$, toothed segments H, fulcrumed on the driver and connected to said toggles, and a movable or sliding and rotating starting-gear, and means, substantially as described, whereby said gear is adapted to mesh with said toothed segments and be stopped in its rotation, substantially in the manner as and for the purpose specified.

6. The combination, with the friction-rim on the drum and the internal clutch-band, F, of the toggles G G, toothed segments fulcrumed on the driver and connected to said toggles, and a movable or sliding starting-gear having cross-bars provided with friction-blocks $l$, adapted to engage said rim, substantially in the manner as and for the purpose herein shown and described.

7. The combination, with the friction-rim on the drum and an internal sectional clutch-band F, of toggles G G, connecting the ends of said sectional brake-band, and retracting spring or springs K, connected to said band, substantially as and for the purpose herein shown and described.

8. The combination, with the friction-rim on the drum and an internal sectional clutch-band, F, of toggles G G, connecting the ends of said sectional brake-band, and having adjustable sectional bars $g'\ g'$ and retracting spring or springs K connected to said band, substantially as and for the purpose herein shown and described.

9. The combination, with the friction-rim B' and external and internal brake and clutch bands and levers for operating said bands, of the intermediate connecting and adjusting mechanism, consisting of the pivoted lever O and adjusting-rod N, provided with small adjusting-wheel $n$, substantially as and for the purpose herein shown and described.

10. The combination, with the friction-rim B', of external and internal brake and clutch bands, C F, and a sliding sleeve or starting-gear having cross-bars provided with friction-blocks $l\ l$, adapted to engage the side of said rim, substantially as and for the purpose herein shown and described.

In witness whereof I affix my signature in presence of two witnesses.

DANIEL H. MERRITT.

Witnesses:
M. H. MAYNARD,
H. J. WOESSNER.